United States Patent
Zaum et al.

(10) Patent No.: US 11,852,502 B2
(45) Date of Patent: Dec. 26, 2023

(54) METHOD FOR FORMING A LOCALIZATION LAYER OF A DIGITAL LOCALIZATION MAP FOR AUTOMATED DRIVING

(71) Applicant: Robert Bosch GmbH, Stuttgart (DE)

(72) Inventors: Daniel Zaum, Sarstedt (DE); Jan Rohde, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 121 days.

(21) Appl. No.: 17/594,473

(22) PCT Filed: Mar. 4, 2020

(86) PCT No.: PCT/EP2020/055611
§ 371 (c)(1),
(2) Date: Dec. 8, 2021

(87) PCT Pub. No.: WO2020/216499
PCT Pub. Date: Oct. 29, 2020

(65) Prior Publication Data
US 2022/0326040 A1    Oct. 13, 2022

(30) Foreign Application Priority Data
Apr. 26, 2019   (DE) .................. 10 2019 205 994.5

(51) Int. Cl.
*G01C 21/00*   (2006.01)
*G01C 21/28*   (2006.01)

(52) U.S. Cl.
CPC ............ *G01C 21/38* (2020.08); *G01C 21/28* (2013.01)

(58) Field of Classification Search
CPC ................................ G01C 21/38; G01C 21/28
See application file for complete search history.

(56) References Cited

U.S. PATENT DOCUMENTS

| | | | |
|---|---|---|---|
| 2017/0052032 A1* | 2/2017 | Miksa | G01C 21/30 |
| 2017/0082454 A1* | 3/2017 | Jurk | G01C 21/20 |
| 2018/0313652 A1* | 11/2018 | Passmann | G01C 21/3833 |

(Continued)

FOREIGN PATENT DOCUMENTS

| | | |
|---|---|---|
| DE | 102011119762 A1 | 6/2012 |
| DE | 102015218042 A1 | 3/2017 |

(Continued)

OTHER PUBLICATIONS

International Search Report for PCT/EP2020/055611 dated Jul. 14, 2020.

*Primary Examiner* — Donald J Wallace
(74) *Attorney, Agent, or Firm* — NORTON ROSE FULBRIGHT US LLP; Gerard Messina

(57) ABSTRACT

A method for forming a localization layer for a digital localization map for automated driving. The method includes: providing the localization layer for a defined region; providing a planning layer for the region; and extracting alignment features from the localization layer that is provided for an alignment with the planning layer, the alignment features being extracted in such a way from the localization layer that an inadmissible deformation of the localization layer may be recognized during the alignment of the planning layer with the localization layer.

8 Claims, 3 Drawing Sheets

(56) References Cited

U.S. PATENT DOCUMENTS

| | | | |
|---|---|---|---|
| 2018/0348789 A1* | 12/2018 | Abeling | G05D 1/0274 |
| 2018/0364349 A1 | 12/2018 | Kudrynski et al. | |
| 2019/0101398 A1* | 4/2019 | Mielenz | G01C 21/30 |
| 2019/0204089 A1* | 7/2019 | Rochan Meganathan | G01S 13/89 |
| 2019/0325264 A1* | 10/2019 | Keserich | G01C 21/3881 |
| 2020/0110817 A1* | 4/2020 | Viswanathan | G06F 16/215 |
| 2020/0166363 A1* | 5/2020 | McGavran | H04L 69/08 |
| 2020/0166945 A1* | 5/2020 | Kim | G01C 21/3889 |
| 2020/0192401 A1* | 6/2020 | Zaum | G05D 1/0276 |

FOREIGN PATENT DOCUMENTS

| | | |
|---|---|---|
| DE | 102017207257 A1 | 10/2018 |
| DE | 102017209283 A1 | 12/2018 |
| DE | 102017214729 A1 | 2/2019 |
| EP | 3137850 A1 | 3/2017 |
| WO | 2017174229 A1 | 10/2017 |

\* cited by examiner

METHOD FOR FORMING A LOCALIZATION LAYER OF A DIGITAL LOCALIZATION MAP FOR AUTOMATED DRIVING

FIELD

The present invention relates to a method for forming a localization layer of a digital localization map for automated driving. The present invention further relates to a device for forming a localization layer of a digital localization map for automated driving. The present invention further relates to a computer program product.

BACKGROUND INFORMATION

Conventional map creation technologies are used to create surroundings maps from sensor observations of mapping vehicles of entire mapping vehicle fleets. Applications of the surroundings maps are for example in the areas of robotics, logistics, the automotive industry, aerospace, consumer goods, etc.

Technologies that make automated driving possible must generally meet very high expectations and requirements. One of these requirements is an availability of a detailed, accurate, instantaneous, and complete digital map ("digital localization map") of the surroundings that is accurate enough to ensure a robust, accurate and reliable localization, planning and navigation of AD (automatic driving) or ADAS (advance driver assistance system) vehicles.

Nowadays, automated vehicles rely on map-based information that supports them with the planning of their routes, the detection of objects, and an assessment of the situation. These maps are usually referred to as HD maps, in contrast to SD maps that are used for conventional navigation tasks.

In high-resolution digital localization maps of this type, it is generally differentiated between the following three layers:

a. A (lowermost) planning layer that contains a precise lane geometry and connectivity information, for example. It is used in particular to keep the automated vehicle in the lane and to support it in the case of maneuver planning.
  b. A (middle) localization layer that contains objects ("landmarks") detected by different sensor types (for example radar sensor, LIDAR sensor, camera, etc.). The instantaneous information detected by the particular sensor is compared with the localization layer with the aim to ascertain the vehicle position within the digital localization map or in the surroundings.
  c. An (uppermost) dynamic layer that contains dynamically changing information, such as for example: roadway condition, traffic situation, weather, parking situation, etc. It is mainly used for comfort functions within the digital localization map.

In addition to the increased accuracy of the digital localization map for automated driving, as compared to conventional localization maps (for example for navigation systems), digital localization maps for automated driving should also be highly up-to-date to provide a high localization accuracy in terms of time and position.

Using the localization layer, a feature-based positioning system may in particular implement the localization of a mobile system (for example automated vehicle) that is detecting the surroundings by decoding the position coordinates from observed landmarks. In a system of this type, marking elements (for example landmarks in the form of traffic signs, roadway lanes, roadway markings, etc.) are detected at specific positions in the surroundings. Measuring the visible angle of the mobile device with regard to the marking element thus makes it possible to ascertain one's own position with regard to the landmark.

PCT Patent Application No. WO 2017/174229 A1 describes a method for determining a position of a vehicle driving in an at least semi-automated manner in the surroundings with the aid of landmarks. In this case, the vehicle is moved in the surroundings, a sequence of localization scenarios being generated thereby, landmark data being digitally processed by at least one vehicle control system for determining the position of the vehicle. It is proposed, to increase or reduce, as needed, an amount of landmark data as a function of localization scenarios.

German Patent Application No. DE 10 2011 119 762 A1 describes a system and a method for determining the position of a motor vehicle, a position determination system that is suitable for a motor vehicle and a corresponding method being proposed in this case. The system includes a digital map, in which data about location-specific features are recorded in a localized manner, at least one surroundings detection device for detecting the location-specific features in the surroundings of the vehicle, and a localization module coupled to the digital map and the surrounding detection device. The localization module includes a processing unit for comparing the detected data to the data recorded in the digital map about the location-specific features and for localizing the vehicle position based on the location-specific features recorded in the digital map in a localized manner.

SUMMARY

An object of the present invention is to provide an improved method for creating a localization layer of a digital localization map.

The object may be achieved according to a first aspect of the present invention with the aid of a method for forming a localization layer of a digital localization map for automated driving, including the steps:
  providing the localization layer for a defined region;
  providing a planning layer for the region; and
  extracting alignment features from the localization layer that is provided for an alignment with the planning layer, the alignment features being extracted in such a way from the localization layer that an inadmissible deformation of the localization layer may be recognized during the alignment of the planning layer with the localization layer.

The mutual alignment of the planning map and the localization map based on the alignment features of the localization map may be advantageously carried out with the aid of a thus generated localization layer in such a way that errors or inadmissible deviations between the localization layer and the planning layer may be easily detected. In this way, correct and usable digital localization maps may be advantageously generated.

Advantageously, it is not necessary in the case of the provided method to check a complete data set for checking an accuracy of a correctness of the alignment of the localization layer with the planning layer. In particular, it is efficiently possible in this way to use a planning layer and a localization layer from different manufacturers when creating the digital localization map.

According to a second aspect of the present invention, the object may be achieved with the aid of a device for forming a localization layer of a digital localization map for automated driving, including:

a provision device for providing the localization layer for a defined region and for providing a planning layer for the region; and an extraction device for extracting alignment features from the localization layer that is provided for an alignment with the planning layer, the alignment features being extractable in such a way from the localization layer that an inadmissible deformation of the localization layer may be detected during the alignment of the planning layer with the localization layer.

According to a third aspect of the present invention, the object may be achieved with the aid of a computer program product.

Advantageous refinements of the method in accordance with the present invention are disclosed herein.

One advantageous refinement of the method in accordance with the present invention provides that the alignment features are designed in a structurally defined manner. In this way, the alignment features form a structure within the localization layer, the change of which may be easily noticed during the alignment of the above-mentioned layers.

A further advantageous refinement of the method in accordance with the present invention provides that the alignment features are designed according to a defined pattern. With the aid of this measure, an inadmissible deformation of the localization layer may also be easily noticed during the alignment of the above-mentioned layers.

A further advantageous refinement of the method in accordance with the present invention provides that the alignment features are designed according to at least one defined statistical criterion. This makes it possible to use powerful statistical tools for extracting and forming the alignment features, with the aid of which an inadmissible deviation during the alignment of the above-mentioned layers is easily detectable.

In a further advantageous refinement of the method in accordance with the present invention, the statistical criterion includes at least one of the following: density distribution, variance. In this way, known statistical criteria are provided for detecting the deformation of the alignment features during the alignment of the above-named layers.

In a further advantageous refinement of the method in accordance with the present invention, an extent for a maximally admissible allowed distortion of the alignment features during the alignment of the localization layer with the planning layer is defined via a threshold value. In this way, a type of control variable is advantageously provided, based on which it may be defined, up to what extent the deformation of the control layer is still admissible. Thus, a threshold value is provided that defines, up to what extent an alignment of the above-mentioned layers is still admissible for providing a usable digital localization map for automated driving. This is advantageous in particular, when the localization layer and the planning layer are provided by different manufacturers or when the two above-mentioned layers originate from different sensor sets.

Further features and advantages of the present invention will be described below in greater detail based on multiple figures. Technical features and advantages of the described device analogously result from the technical features and device of the described method.

DETAILED DESCRIPTION OF EXAMPLE EMBODIMENTS

Figure 1:
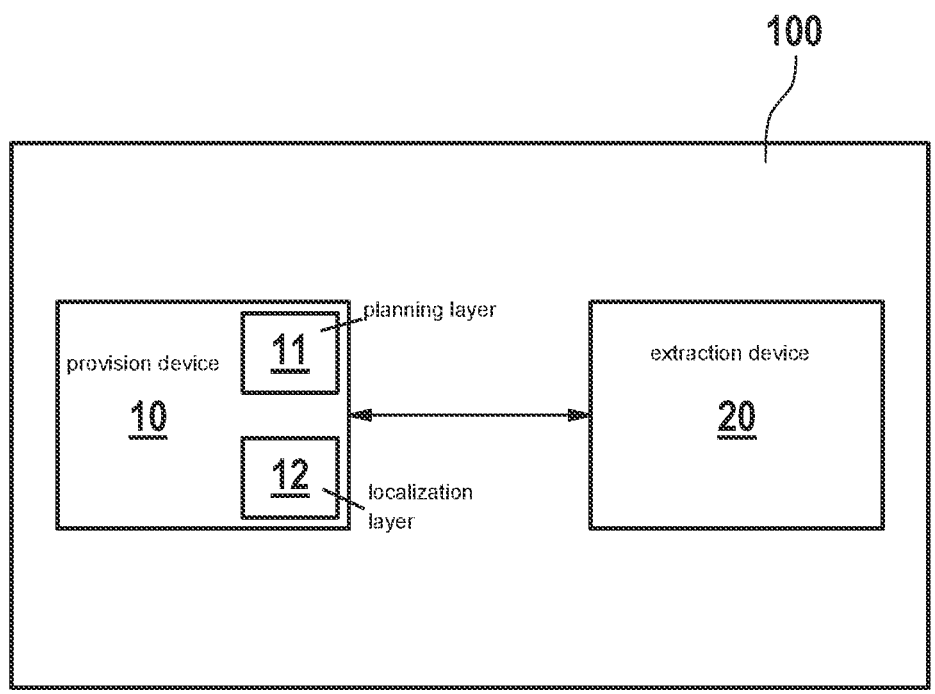
FIG. 1 shows a schematic illustration of a provided device for forming a localization layer of a digital localization map for automated driving, in accordance with an example embodiment of the present invention.

One feature of the present invention is in particular to make possible an improved alignment of the localization layer with the planning layer of a digital localization map. In particular, it is intended to make it possible to detect errors during the alignment of the above-mentioned layers and thus to efficiently control the manufacturing process of the digital localization map.

During the alignment process, non-linear transformations are preferably applied to the localization layer in order to align same exactly with regard to the planning layer. It must be ensured that the applied transformations do not destroy the digital localization map or render it useless (error control). Here, statistical measures are preferably carried out prior to and following the alignment process to determine whether it is possible that the alignment process is carried out inadmissibly or the alignment is carried out unsuccessfully.

If the alignment features were derived in such a way that they have relevant statistical properties or parameters (for example, density distribution, variance, etc.) of the localization layer, from which they were derived, the alignment features themselves may be used to assess an error that was introduced as a result of the non-linear transformation.

Advantageously, it is thus not necessary to use the entire data material of the above-mentioned layers to check the alignment process. This complies with data protection interests, for example, if the above-mentioned map layers originate from different manufacturers that are interested in data protection with regard to their own supplied map layers.

With the aid of the provided method in accordance with the present invention, the alignment process may be advantageously accelerated, since the computation of cyclic measures based on the reduced number of alignment features is in general much faster than when the total amount of data of the localization layer is used.

During the alignment process of the localization layer, the localization layer is subjected to non-linear transformations that aim to sufficiently precisely ascertain the identified alignment features in both layers (localization layer and planning layer). Since identifying matching alignment objects or features is an automated process, errors may occur (for example the localization layer being erroneously shifted in a way that renders it useless for an instantaneous localization process).

According to the present invention, statistical measures, such as for example a density distribution or a variance prior to and following the above-named non-linear transformation, are thus ascertained for the purpose of extracting alignment features. An analysis of these statistical measures may be used to ascertain erroneous transformations (for example if a difference between the density of alignment features or localization objects in an imagined region exceeds a threshold value following the transformation).

It is provided to compute the alignment features in a way that allows the error control to be carried out directly by using alignment features 1a . . . 10, it not being necessary to use the entire localization layer for this. For this purpose, the alignment features are selected in a way that allows errors to be easily recognizable.

The following illustrations show in a qualitative manner the provided principle of extracting the alignment features.

FIG. 1 shows a block diagram of a device 100 for forming a localization layer of a digital localization map for automated driving. Device 100 includes a provision device 10 for providing localization layer 12 for a defined region and for providing a planning layer 11 for the region. Furthermore, device 100 includes an extraction device 20 for extracting alignment features 1a . . . 1n from localization layer 12 that is provided for an alignment with planning layer 11, alignment features 1a . . . 1n being extractable in such a way from localization layer 12 that an inadmissible deformation of localization layer 12 may be recognized during the alignment of planning layer 11 with localization layer 12.

Figure 2:
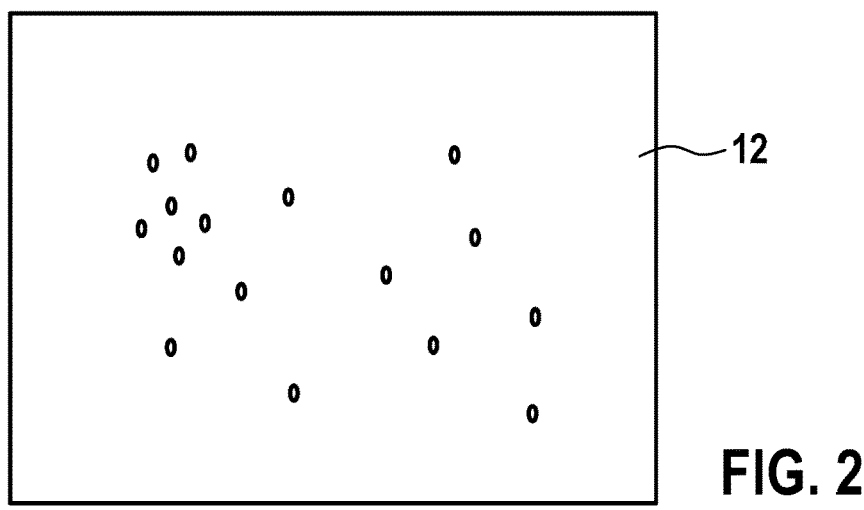
FIGS. 2 through 4 are figures for schematically elucidating the provided arrangement of alignment features of a localization layer, in accordance with an example embodiment of the present invention.

FIG. 2 shows a schematic illustration of a localization layer 12 including landmarks that were detected with the aid of a radar sensor, for example.

Figure 3:
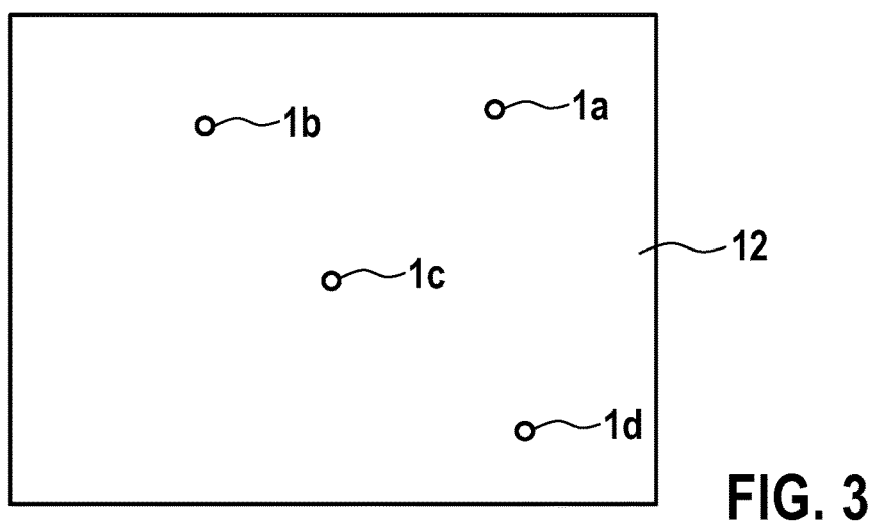

FIG. 3 shows localization layer 12 including conventional alignment features 1a . . . 1d extracted from localization layer 12 from FIG. 2. Here, a statistical distribution of alignment objects 1a . . . 1d does not correspond to an arrangement of the landmarks from FIG. 2.

Figure 4:
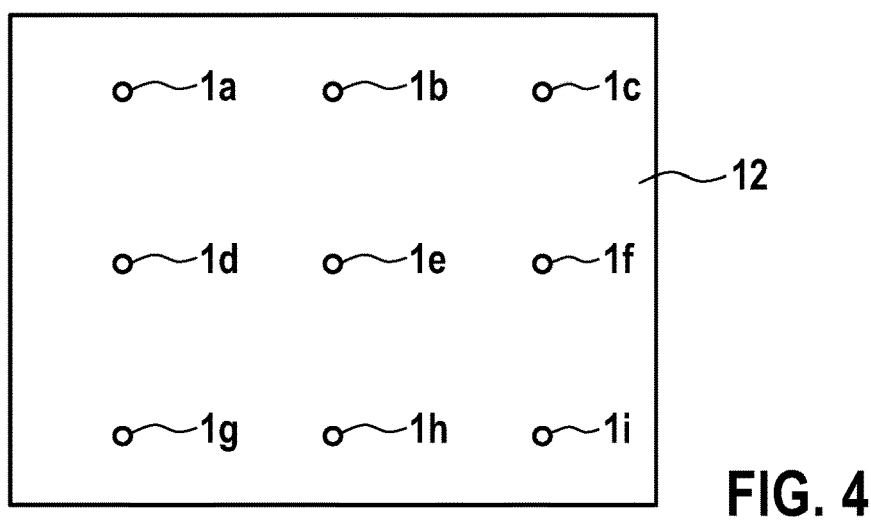

In FIG. 4, it is indicated that alignment features 1a . . . 1n are now situated in a structured manner according to the present invention, in the case of FIG. 4 merely qualitatively and in the form of squares by way of example, a statistical distribution of the alignment objects corresponding to an arrangement of the landmarks from FIG. 2 in this case.

It is apparent that by positioning alignment features 1a . . . 1n from FIG. 4 in an orderly manner, which is represented merely illustratively and by way of example, an inadmissible distortion of alignment features 1a . . . 1n of localization layer 12 with regard to planning layer 11 (not illustrated) is easily recognizable and thus an erroneous alignment of localization layer 12 with planning layer 11 may be easily established. As a result, a correct manufacturing process of the digital localization map is thus already supported at an early stage.

Advantageously, the surroundings data provided by the method according to the present invention may be used to create very accurate and robust digital localization maps that are as complete and highly available as possible. It is advantageous that the general principle is very simple and allows for many implementations and applications that are described above only by way of example.

Device 100 is preferably designed in the cloud as a computational device, on which a computer program product is carried out.

Figure 5:
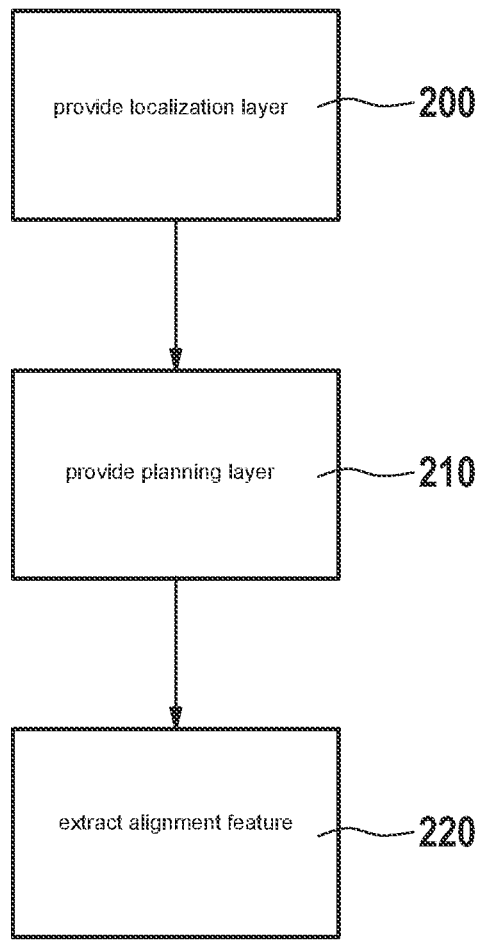
FIG. 5 shows a schematic illustration of a flowchart of a provided device for forming a localization layer of a digital localization map for automated driving, in accordance with an example embodiment of the present invention.

FIG. 5 shows a schematic flowchart of a provided method for forming a localization layer of a digital localization map for automated driving.

In a step 200, a provision of a localization layer for a defined region takes place.

In a step 210, a provision of a planning layer for the region is carried out.

Finally, in a step 220, an extraction of alignment features 10a . . . 10n from the localization layer that is provided for an alignment with the planning layer is carried out, alignment features 10a . . . 10n being extracted in such a way from the localization layer that an inadmissible deformation of the localization layer may be recognized during the alignment of the planning layer with the localization layer.

The method according to the present invention may be advantageously implemented as a software that preferably runs in a cloud-based manner on a server device. An easy adaptability of the method is thus facilitated.

Those skilled in the art will modify and/or combine the features of the present invention in a suitable way, without departing from the core of the present invention.

What is claimed is:

1. A method for forming a localization layer of a digital localization map for automated driving, the method comprising:
   providing the localization layer, which is a localization map, for a defined region;
   providing a planning layer, which is a planning map, for the region; and
   extracting alignment features from the localization layer provided for an alignment with the planning layer, the alignment features being extracted from the localization layer so that an inadmissible deformation of the localization layer is recognizable during the alignment of the planning layer with the localization layer;
   wherein mutual alignment of the planning layer and the localization layer based on the alignment features of the localization layer is carried out with the localization layer so that errors or inadmissible deviations between the localization layer and the planning layer are detected for generating the digital localization map, which is correct,
   wherein it is not necessary to check a complete data set for checking an accuracy or a correctness of the alignment of the localization layer with the planning layer, and
   wherein during the alignment, non-linear transformations are applied to the localization layer to align the localization layer exactly with regard to the planning layer.

2. The method as recited in claim 1, wherein the alignment features are configured in a structurally defined manner.

3. The method as recited in claim 1, wherein the alignment features are configured according to a defined pattern.

4. The method as recited in claim 1, wherein the alignment features are configured according to at least one defined statistical criterion.

5. The method as recited in claim 4, wherein the statistical criterion includes at least one of the following: density distribution or variance.

6. The method as recited in claim 1, wherein an extent of a maximally admissible allowed distortion of the alignment features during the alignment of the localization layer with the planning layer is defined via a threshold value.

7. A device for forming a localization layer of a digital localization map for automated driving, comprising:
   a provision device to provide the localization layer for a defined region and to provide a planning layer for the region; and
   an extraction device to extract alignment features from the localization layer that is provided for an alignment with the planning layer, the alignment features being extracted from the localization layer so that an inadmissible deformation of the localization layer is recognizable during the alignment of the planning layer with the localization layer;
   wherein mutual alignment of the planning layer and the localization layer based on the alignment features of the localization layer is carried out with the localization layer so that errors or inadmissible deviations between the localization layer and the planning layer are detected for generating the digital localization map, which is correct, wherein it is not necessary to check a complete data set for checking an accuracy or a correctness of the alignment of the localization layer with the planning layer, and wherein during the alignment, non-linear transformations are applied to the localization layer to align the localization layer exactly with regard to the planning layer.

8. A non-transitory computer-readable data medium, on which is stored a computer program, which is executable by a processor, comprising:

a program code arrangement including program code for forming a localization layer of a digital localization map for automated driving, the computer program, by performing the following:

providing the localization layer for a defined region;

providing a planning layer for the region; and extracting alignment features from the localization layer provided for an alignment with the planning layer, the alignment features being extracted from the localization layer so that an inadmissible deformation of the localization layer is recognizable during the alignment of the planning layer with the localization layer;

wherein mutual alignment of the planning layer and the localization layer based on the alignment features of the localization layer is carried out with the localization layer so that errors or inadmissible deviations between the localization layer and the planning layer are detected for generating the digital localization map, which is correct, wherein it is not necessary to check a complete data set for checking an accuracy or a correctness of the alignment of the localization layer with the planning layer, and wherein during the alignment, non-linear transformations are applied to the localization layer to align the localization layer exactly with regard to the planning layer.

\* \* \* \* \*